(12) United States Patent
Antipa et al.

(10) Patent No.: US 9,313,449 B2
(45) Date of Patent: Apr. 12, 2016

(54) CROSS-DEVICE INFORMATION EXCHANGE VIA WEB BROWSER

(71) Applicant: Adobe Systems Incorporated, San Jose, CA (US)

(72) Inventors: Damien Antipa, Saint-Louis (FR); Alexandre Capt, Landser (FR); Oscar Bolanos, Basel (CH)

(73) Assignee: Adobe Systems Incorporated, San Jose, CA (US)

( * ) Notice: Subject to any disclaimer, the term of this patent is extended or adjusted under 35 U.S.C. 154(b) by 174 days.

(21) Appl. No.: 14/266,266

(22) Filed: Apr. 30, 2014

(65) Prior Publication Data

US 2015/0319403 A1 Nov. 5, 2015

(51) Int. Cl.
*H04N 5/77* (2006.01)
*H04N 5/93* (2006.01)
*H04L 29/08* (2006.01)

(52) U.S. Cl.
CPC . *H04N 5/93* (2013.01); *H04L 67/10* (2013.01)

(58) Field of Classification Search
CPC ..... H04N 5/772; H04N 1/2112; H04N 5/907; H04N 2101/00; H04N 5/77
USPC .......................................................... 386/224
See application file for complete search history.

(56) References Cited

U.S. PATENT DOCUMENTS

| | | | |
|---|---|---|---|
| 2012/0095853 A1* | 4/2012 | von Bose | G06Q 20/20 705/16 |
| 2013/0141587 A1* | 6/2013 | Petricoin, Jr. | G07C 9/00111 348/156 |

* cited by examiner

*Primary Examiner* — William C Vaughn, Jr.
*Assistant Examiner* — Daniel Tekle
(74) *Attorney, Agent, or Firm* — Finch & Maloney PLLC

(57) ABSTRACT

Techniques are disclosed for exchanging information between devices. Each device is configured to execute a web browser application. One of the devices is referred to as a streamer device, and the other a receiver device. The receiver device includes a camera for receiving images displayed by the streamer device. A user of the streamer device can orient the display of the streamer towards the camera of the receiver device. The receiver device uses the camera to observe images displayed by any streamer devices that are present within the field of view of the camera. The receiver device, via the camera, analyzes each video frame displayed by the streamer device for a pattern. If the pattern is detected and matches a predefined pattern, the receiver device can retrieve information associated with the pattern, and display that information in the web browser.

20 Claims, 5 Drawing Sheets

CROSS-DEVICE INFORMATION EXCHANGE VIA WEB BROWSER

FIELD OF THE DISCLOSURE

This disclosure relates to the field of data processing, and more particularly, to techniques for exchanging information between devices.

BACKGROUND

In an establishment with an open environment, such as a retail store or conference room, there can be one or more electronic displays for displaying information to patrons or other visitors. Such monitors can be mounted in locations that are readily visible, such as above entrances or aisles, near store shelves or product displays, on walls, or in other suitable locations. The displays can be used for a variety of purposes, such as advertising and providing various other forms of information that may be of interest to the visitors. However, if the visitors are anonymously present in the environment, the displays may only be able to show information of general interest, since little to nothing can be known of the visitors unless and until those visitors present some form of identification.

BRIEF DESCRIPTION OF THE DRAWINGS

The accompanying drawings are not intended to be drawn to scale. In the drawings, each identical or nearly identical component that is illustrated in various figures is represented by a like numeral.

DETAILED DESCRIPTION

Figure 1:
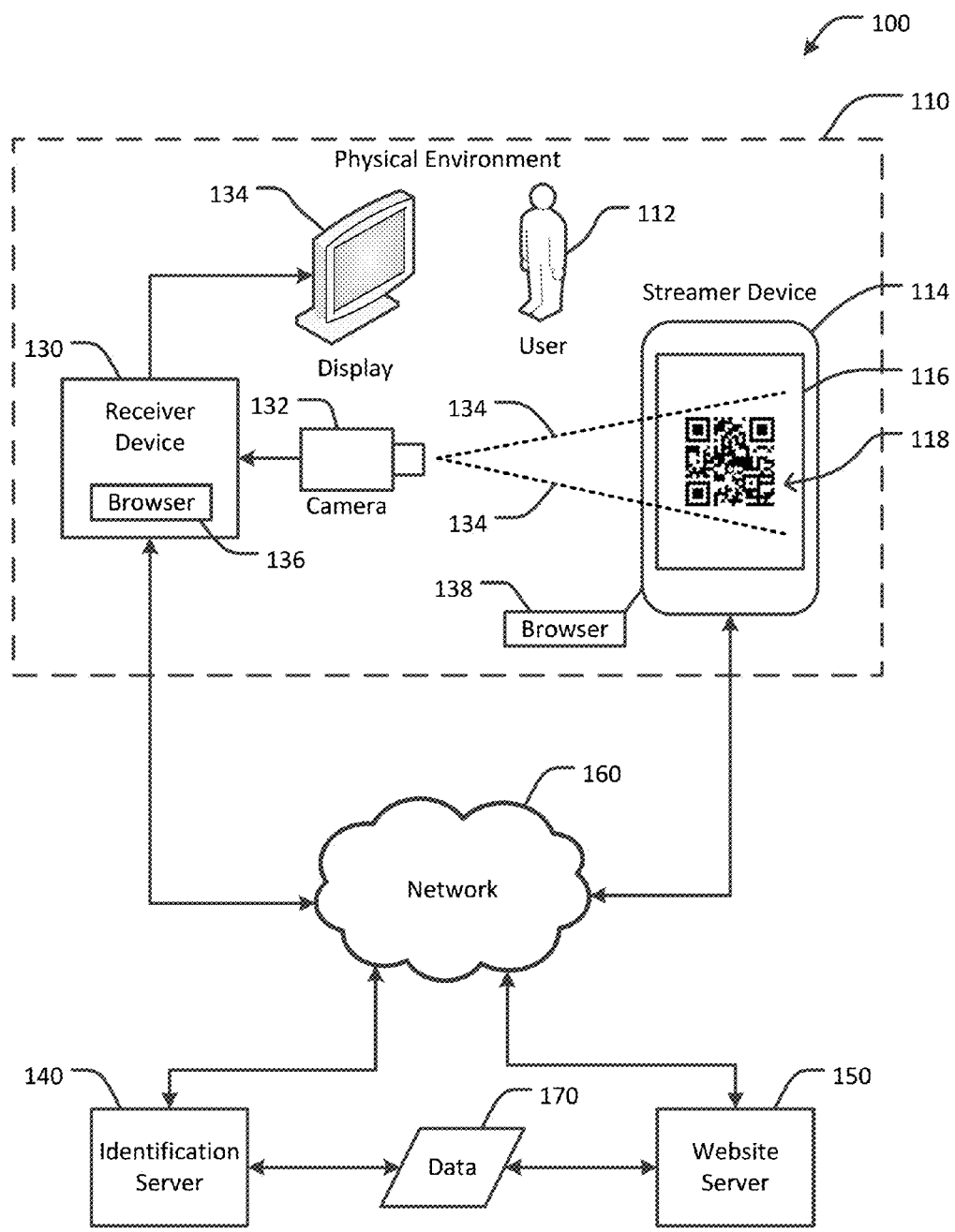
FIG. 1 illustrates an example client-server system for exchanging information between devices, in accordance with an embodiment of the present invention.

As noted above, when a visitor to an establishment remains anonymous, it may only be possible to display information of general interest, as opposed to information that is customized or tailored for that visitor. On the other hand, if the establishment can identify the visitor while he or she is present in the environment, the displays could potentially be used to show information that is customized for that visitor's preferences and needs. Many people now carry smartphones or other mobile computing devices everywhere they go. Such devices often have standard, built-in wireless network (e.g., Internet) connectivity, which provides access to many online resources, including websites. Such websites are commonly accessed using a web browser application executing on the mobile device. Concurrently, many establishments, such as retail stores and office buildings, have computing devices with network connectivity and web browsers or other applications for accessing and presenting information. These computing devices may be mobile or installed in fixed locations within a particular environment. When a user of a mobile device is in close proximity to one of the establishment's devices, or to another user's device, there is an opportunity for the devices to exchange information with each other wirelessly. In many such situations, the devices have no existing data connection, and therefore one must be established. A number of techniques for exchanging information wirelessly between devices exist, including a WiFi® network connection, an infrared (IR) signal transmission, and radio frequency identification (RFID) readers and transponders. However, these existing techniques have several undesirable limitations. For instance, a WiFi® connection requires additional user configuration to establish a connection, and the network connection itself poses security concerns for both devices. Also, technologies like IR and RFID require specialized hardware and software that is not commonly installed on most consumer mobile devices (e.g., cell phones, tablet computers, portable media players, etc.). These and other limitations increase the difficulty of wirelessly exchanging information between devices that have no established data connection.

To this end, and in accordance with an embodiment of the present invention, techniques are disclosed for exchanging information between devices. Each device is configured to execute a web browser or other suitable application for retrieving, displaying and interacting with content. One of the devices is referred to as a streamer device, and another one of the devices is referred to as a receiver device. Although any device can act as a streamer or a receiver, the receiver device includes a camera or other instrument for receiving images displayed or rendered by the streamer device. The web browser of the streamer device can be configured to display, among other things, a unique identifier or image pattern, such as a barcode or color pattern. A user of the streamer device can orient the display of the streamer device towards the camera of the receiver device. The receiver device uses the camera to observe images displayed by any streamer devices that are present within the field of view of the camera. The receiver device, via the camera, analyzes each video frame displayed by the streamer device for the unique identifier. If the image pattern is detected and matches a predefined pattern, the receiver device can retrieve information associated with the image pattern (e.g., from a server), and display that information in the web browser. In some cases, the image pattern can be associated with a particular person or a piece of information associated with that person, such that the receiver device can use the image pattern to identify the person for retrieving and displaying customized information that is customized for that person. Numerous configurations and variations will be apparent in light of this disclosure.

The term "web browser," as used herein, generally refers to any application for retrieving, presenting and traversing information resources. Such information resources may be referenced via a Uniform Resource Identifier or Locator (URI/URL) and contain any type of content. Non-limiting examples of a web browser include Internet Explorer, Safari, Firefox, Opera and Google Chrome.

An "image pattern" generally refers to any graphical indicia that can be detected within digital content and compared against a predefined pattern or otherwise analyzed. Example image patterns include barcodes, color patterns, embedded codes (e.g., numerical, letter-based, alphanumerical, symbolical, vectors, or other code-like data), digital watermark, or any other indicia that can be digitally detected and analyzed. A given image pattern can be selectively provisioned within a sequence of video frames or other digital content so as to be digitally detectable. The image pattern can be presented in a sub-second time period (e.g., 1/60 second) or in an otherwise fleeting manner so as to be imperceptible to the ordinary human observer.

The term "content" or "digital content," as used herein, generally refers to any type of information that a user can interact with electronically, including, for example, text, images, audio, video, and graphics. Content may be included in documents, data, applications, services, web pages, e-mail messages, and electronic files. Examples of such content include messages that are posted to a social networking website, messages that are sent from one user computing device to another via an instant messaging or e-mail service, and photographs that are displayed on a blog. Content can, in some cases, include metadata (i.e., data about data) that may not be directly accessible by a user, such as message routing information, timestamps, authentication credentials, browser cookies, etc. Other examples will be apparent in light of the present disclosure.

In an example embodiment, both the streamer and receiver devices can connect to one or more websites or online services for, among other things, mutual identification and content retrieval purposes. The streamer device retrieves content from a website, which can be shown to the user on an electronic visual display (e.g., a conventional television or computer monitor, including a liquid crystal display (LCD) or a light emitting diode (LED) display) of the streamer device. The content can include an image pattern or code executable for generating the pattern on the display (e.g., JavaScript code). The image pattern is associated with a piece of information, such as documents, graphics, advertisements, presentations, or any other form of data. The image pattern, when displayed on the streamer device, can be machine-readable and take on any form, such as a barcode, graphic or color pattern. In some cases, the image pattern can be used to uniquely identify the user of the streamer device. In some other cases, the image pattern can be used to uniquely identify a document or other information associated with, or customized for, the streamer device or the user of the streamer device. The image pattern can be displayed on the screen of the streamer device for such short periods of time that the image pattern is imperceptible to the human eye yet observable by the camera of the receiver device. For example, the image pattern may appear in a single image frame that is displayed for 1/60th of a second, which is too short an amount of time for the human eye to perceive, but long enough to be detected by the camera of the receiver device. If the display of the streamer device is oriented towards the camera of the receiver device while the pattern is being shown, the receiver device can detect the image pattern, compare it to a predefined pattern associated with the user of the streamer device, and display information that is customized for the user.

Example System

FIG. 1 illustrates an example client-server system 100 for exchanging information between devices, in accordance with an embodiment. At least a portion of the system 100 can operate within a physical environment 110, such as a retail store, office, conference room, lobby, transportation depot, library, restaurant, park, or any other space in which a user 112 is in proximity to at least some components of the system 100, as will be described in further detail below. The system 100 includes one or more streamer devices 114, one or more receiver devices 130, and one or more servers, such as an identification server 140 and a website server 150, each electronically interconnected via a network 160 (e.g., a wide area network, such as the Internet, or a local area network). Generally, the streamer device 114 and the receiver device 130 can be any type of device, such as a personal computer (PC), tablet, or smart phone, configured to access and provide content (e.g., a web page, a word processing document, a fixed layout document, etc.) provisioned by the servers 140, 150 or another content-providing server. The streamer device 114 can include a display 116 for displaying, among other things, a machine-readable pattern 118. The display 116 can also be used to display any other type of human-readable content. The display 116 can include any electronic visual display device (e.g., a conventional television or computer monitor, including a liquid crystal display (LCD) or a light emitting diode (LED) display). In some cases, the display 116 can be physically integrated into the streamer device 114 (e.g., such as commonly found on a conventional smartphone). The receiver device 130 can include a camera 132 and a display 134. The camera 132 can be any device configured to detect light and form an image so as to, for example, detect the pattern 118 displayed by the streamer device 114 when the streamer device is within a field of view of the camera, as diagrammatically depicted in FIG. 1 by the dashed lines 134. The display 134 can include any electronic visual display device (e.g., a conventional television or computer monitor, including a liquid crystal display (LCD) or a light emitting diode (LED) display).

By way of example, the streamer device 114 may include a smartphone (e.g., Apple iPhone, Android, BlackBerry, Windows Phone, etc.) or other suitable mobile computing device. By way of further example, the receiver device 130 can include a personal computer or other suitable computing device, such as a desktop device. As will be appreciated in view of this disclosure, the streamer device 114 does not necessarily need to be mobile by design; however, if the streamer device is mobile and the display 116 is physically integrated into the streamer device, it may be easier for the user 112 to physically orient the display toward the field of view 134 of the camera 132 when, e.g., the camera is in a fixed position. Alternatively, the receiver device 130 can be mobile, where the camera 132, the display 134, or both are physically integrated into the receiver device (e.g., the receiver device may be a smartphone). It will be understood that the functions of the computing devices variously described in this disclosure can be performed on and by any number of computing devices, depending on the particular application of the system. For instance, one or more of the devices 114, 130 can each include a web browser 136, 138 or other application suitable for retrieving, processing, displaying and interacting with content provisioned by an identification server 140, a website server 150, or any combination of these or other servers. Data 170 representing the content, identification information and the pattern 118 can be stored in one or more databases or other storage devices accessible by, e.g., the servers 140, 150.

The machine-readable pattern 118 can be any suitable pattern. Non-limiting examples of the pattern include one- or two-dimensional barcodes (e.g., Quick Response, or QR, codes), color patterns, or other graphics or symbols that convey meaning, and that such meaning can be extracted by a computer. The pattern 118 can represent any type of information in encoded or plain text form. Non-limiting examples of such information include user identity, a serial number, a document file name/location (e.g., a URL), a numeric value, an access code, text, instructions that can be executed by a processor (e.g., "retrieve data x from database y), or any other data.

Figure 2:
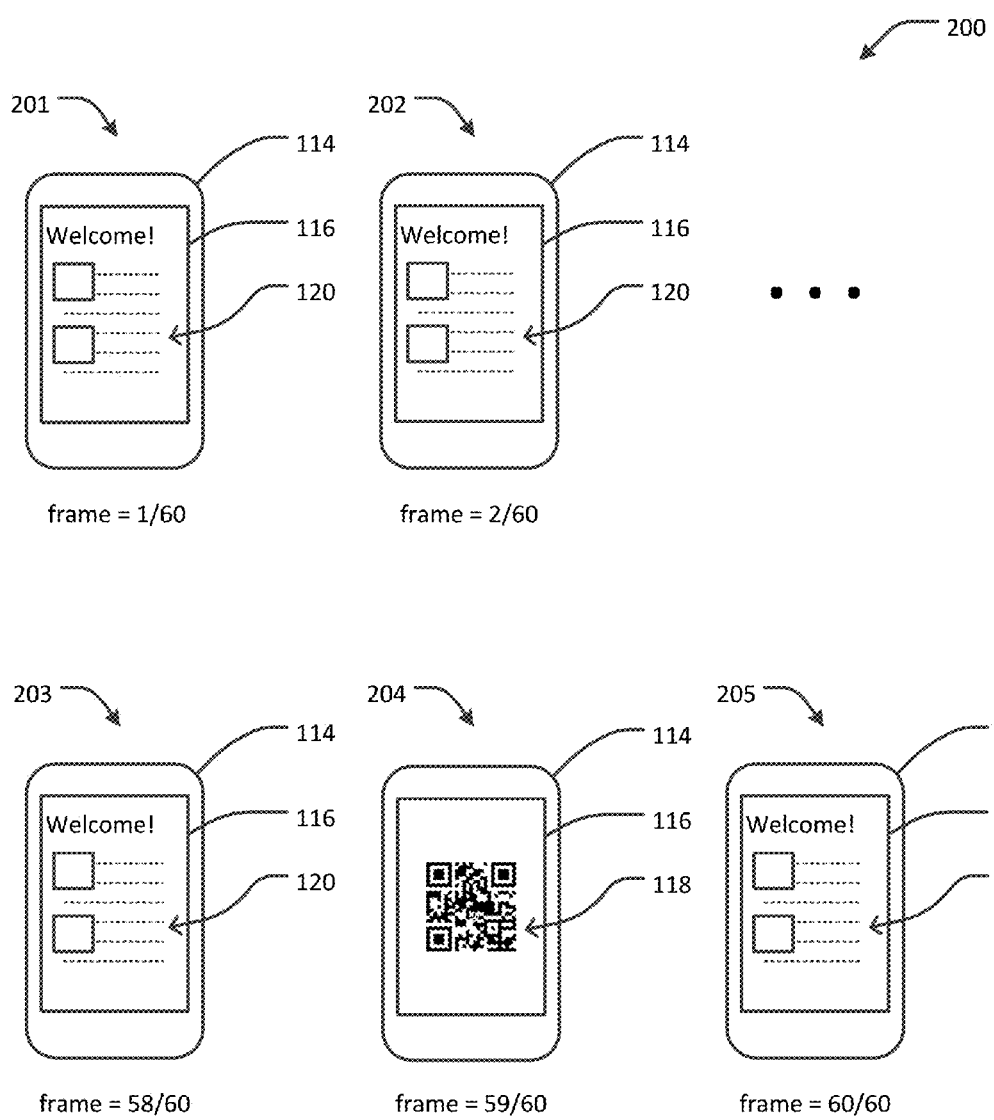
FIG. 2 depicts an example sequence of video frames that can be displayed at a given frame rate, in accordance with an embodiment of the present invention.

FIG. 2 depicts an example sequence of video frames 200 that can be displayed at a given frame rate by the streamer device 114, in accordance with an embodiment of the present invention. In use, the streamer device 114 can connect to a website, login and receive web page content 120. The streamer device 114 can be configured to display the web page content 120 on the display 116, such as indicated at 201 in FIG. 2. The streamer device 114 is further configured to update the display 116 at a particular frame rate, such as 60 frames per second or any other frame rate that is supported by the streamer device. This succession of frames is indicated, for example, at 202, 203 and 205 in FIG. 2. Additionally, the streamer device 114 can be configured to receive the machine-readable pattern 118 from the website server 150 and display the pattern on the display 116 during one or more frames, such as indicated at 204, using a steganographic technique that conceals the pattern 118 from visual perception by a human. Steganography includes the practice of hiding or concealing one message within another in a way that others cannot discern the presence of the hidden or concealed message. For instance, since the human eye cannot perceive more than approximately 24 frames per second, it is possible to display the pattern 118 for such a small amount of time (e.g., for 1/60th of a second) that the pattern is imperceptible to the user 112 when viewing the display 116 with the naked eye, yet perceptible to the camera 132 of the receiver device 130. It will be understood that the pattern 118 can be displayed for any number of frames (e.g., one, two, three, etc.); however, if the pattern 118 is displayed for more than approximately 24 frames per second, the user 112 may see a flickering image as the frames change between the web content 120 and the pattern 118, or the web content 120 may not be viewable at all. It will also be understood that the pattern 118 and web content 120 can be displayed in any sequence of frames, and that the pattern 118 can be displayed at any interval of time (e.g., once per second, twice per second, once per five seconds, twice per ten seconds, once per thirty seconds, etc.). In this manner, the user 112 can interact normally with the web content 120 even while the pattern 118 is being briefly displayed.

Example Methodologies

Figure 3:
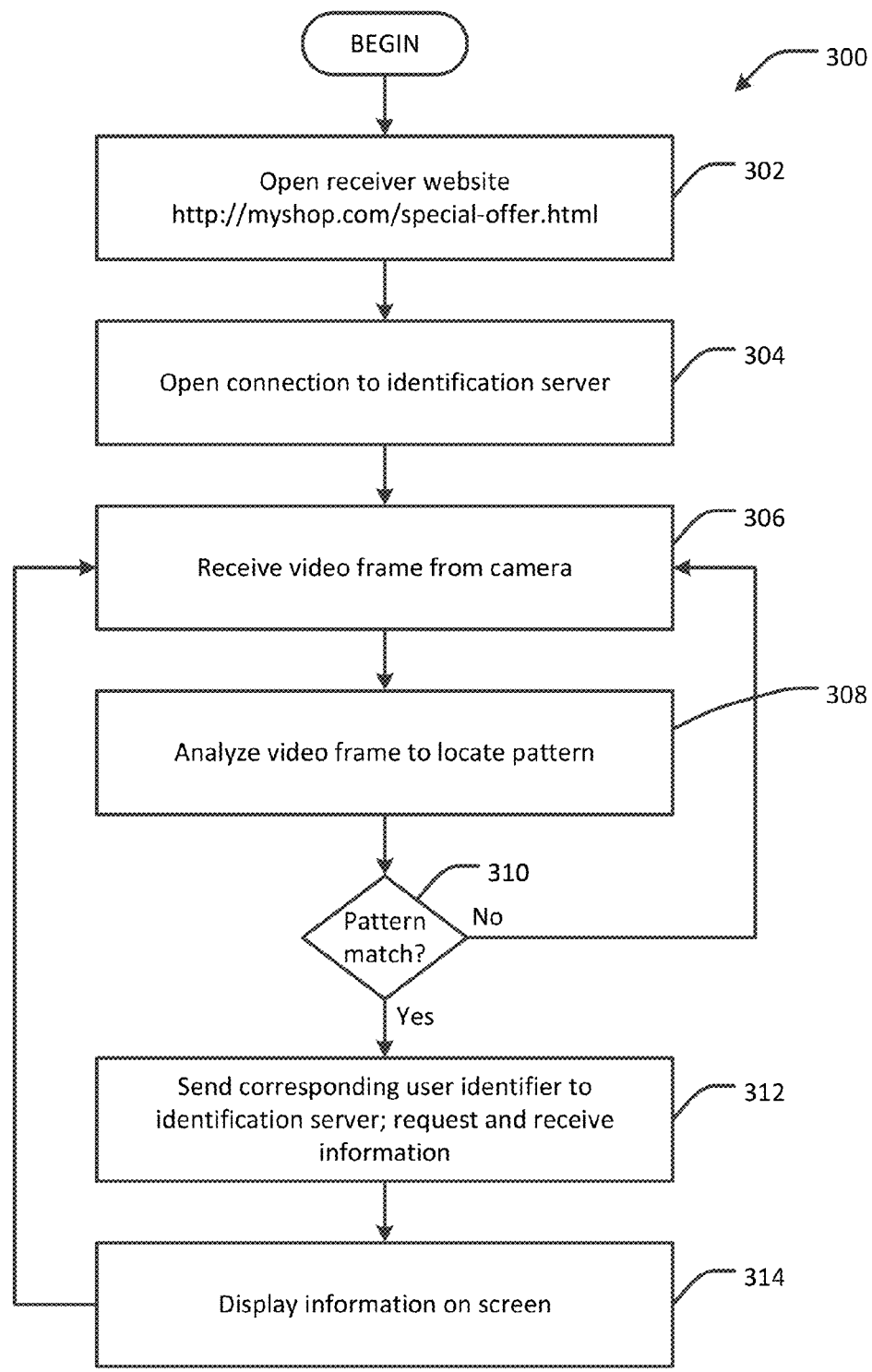
FIG. 3 is a data flow diagram representative of an example methodology for exchanging information between devices, in accordance with an embodiment of the present invention.

FIG. 3 is a flow diagram of an example receiver-side methodology 300 for exchanging information between devices, in accordance with an embodiment. The example methodology 300 may, for example, be implemented by the browser 136 of the receiver device 130 of FIG. 1. The method 300 begins by opening (302) a receiver website and retrieving content from the receiver website. The method 300 further includes opening (304) a connection to an identification server, which in some cases may be the same server that hosts the receiver website. The identification server provides services that enable the receiver device to obtain the identity of other devices, such as the streamer device 114 of FIG. 1, based on the pattern displayed by the streamer device. For example, the pattern may be a predefined pattern generated by the identification server. The pattern can be associated with a user of a streamer device, such as the streamer device 114 of FIG. 1, or with any data associated with the streamer device (e.g., documents, files, purchase history, customer information, user profiles, or other data). The connection to the identification server may, for example, be established using WebSockets, long polling, heartbeat Ajax (Asynchronous JavaScript and XML), or other suitable techniques.

The method 300 continues by receiving (306) a video frame from a camera, and analyzing (308) the video frame for the pattern. This can be achieved, in some embodiments, using a requestAnimationFrame method or WebGL frame buffer. For example, when a user of the streamer device orients the display towards the camera, any pattern on the display may be received by the camera and analyzed by the receiver device. As discussed above, the pattern may appear in a single frame of video that is updating at, for example, 60 frames per second. While such a pattern may not be perceivable by the human eye, the camera can detect the frame containing the pattern. If the pattern matches (310) a predefined pattern, a user identifier associated with the pattern is sent (312) to the identification server, along with a request for information (e.g., an advertisement, sales offer, or other data). The information is then displayed (314) on a screen, such as the display 134 of FIG. 1. Otherwise, the method continues to receive and analyze video for a pattern (306). The method 300 can continue to receive and analyze additional video frames indefinitely, processing any patterns that are detected. For example, the method 300 may be used to detect patterns displayed by the streamer devices of different users as they come into proximity of the receiver device, and subsequently display customized information for those users.

Figure 4:
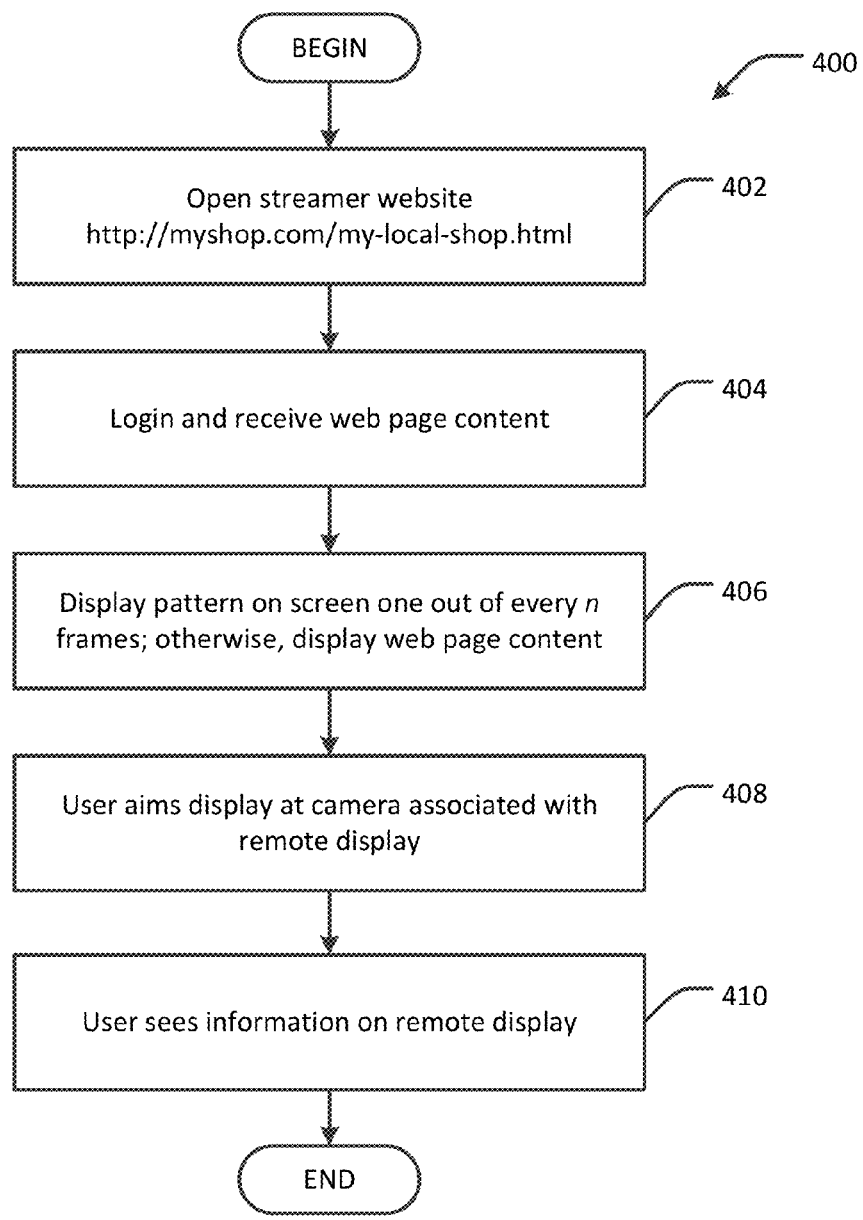
FIG. 4 is a data flow diagram representative of another example methodology for exchanging information between devices, in accordance with an embodiment of the present invention.

FIG. 4 is a flow diagram of an example streamer-side methodology 400 for exchanging information between devices, in accordance with an embodiment. The example methodology 400 may, for example, be implemented by the browser 138 of the streamer device 114 of FIG. 1. The method 400 begins by opening (402) a streamer website and retrieving (404) content from the streamer website. The content may include software that when executed by a processor of the streamer device causes a pattern (e.g., a barcode, color pattern, etc.) to be displayed on a screen of the streamer device (e.g., display 116 of FIG. 1) instead of, or in addition to, the content. The method further includes displaying (406) the pattern on the screen during one out of every n frames (e.g., where n is 60 and the frame update rate is 60 frames per second), and otherwise displaying the content. In this manner, the user of the streamer device can view the content but will not perceive the pattern. The user can aim (408) the display of the streamer device toward a camera associated with a remote display, which in turn displays (410) information associated with the pattern to the user.

Example Computing Device

Figure 5:
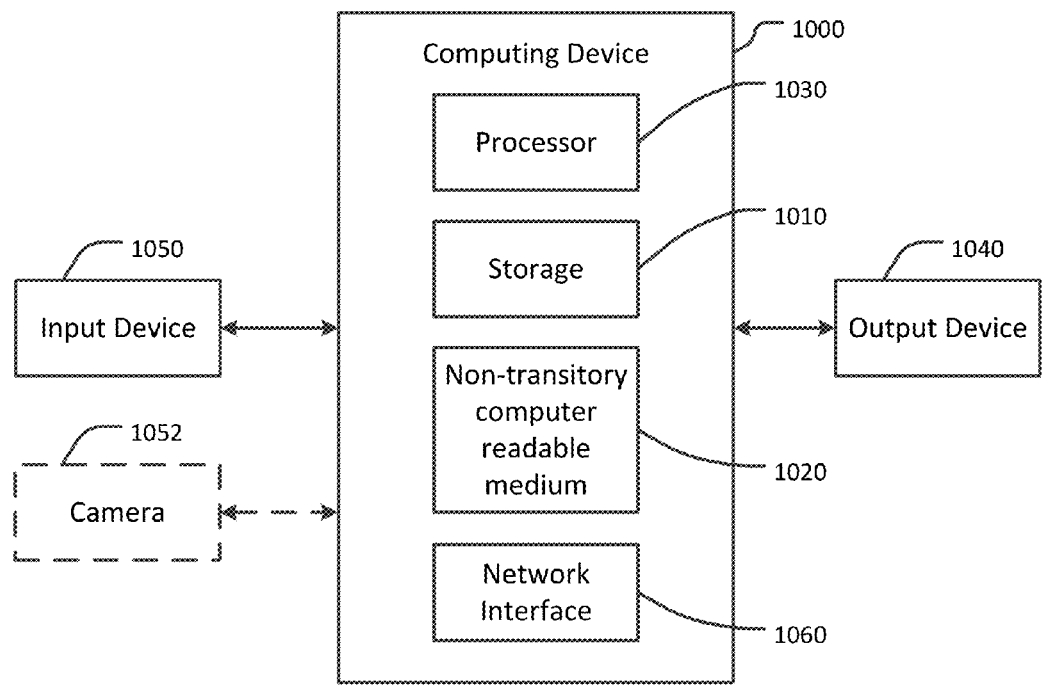
FIG. 5 is a block diagram representing an example computing device that may be used in accordance with an embodiment of the present invention.

FIG. 5 is a block diagram representing an example computing device 1000 that may be used to perform any of the techniques as variously described herein. For example, the streamer device 114, the receiver device 130, the servers 140, 150, or any combination of these (such as described with respect to FIG. 1) may be implemented in the computing device 1000. The computing device 1000 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described herein. A distributed computational system may be provided comprising a plurality of such computing devices.

The computing device 1000 includes one or more storage devices 1010 and/or non-transitory computer-readable media 1020 having encoded thereon one or more computer-executable instructions or software for implementing techniques as variously described herein. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught herein. The storage device 1010 may include other types of memory as well, or combinations thereof. The storage device 1010 may be provided on the computing device 1000 or provided separately or remotely from the computing device 1000. The non-transitory computer-readable media 1020 may include, but are not limited to, one or more types of hardware memory, non-transitory tangible media (for example, one or more magnetic storage disks, one or more optical disks, one or more USB flash drives), and the like. The non-transitory computer-readable media 1020 included in the computing device 1000 may store computer-readable and computer-executable instructions or software for implementing various embodiments. The computer-readable media 1020 may be provided on the computing device 1000 or provided separately or remotely from the computing device 1000.

The computing device 1000 also includes at least one processor 1030 for executing computer-readable and computer-executable instructions or software stored in the storage device 1010 and/or non-transitory computer-readable media 1020 and other programs for controlling system hardware. Virtualization may be employed in the computing device 1000 so that infrastructure and resources in the computing device 1000 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1000 through an output device 1040, such as a screen or monitor, which may display one or more user interfaces provided in accordance with some embodiments. The output device 1040 may also display other aspects, elements and/or information or data associated with some embodiments. The computing device 1000 may include other I/O devices 1050 for receiving input from a user, for example, a keyboard, a joystick, a game controller, a pointing device (e.g., a mouse, a user's finger interfacing directly with a display device, etc.), or any suitable user interface. The computing device 1000 may include other suitable conventional I/O peripherals. The computing device 1000 can include and/or be operatively coupled to various suitable devices for performing one or more of the functions as variously described herein. For instance, the computing device may include or be operatively coupled to a camera 1052 for detecting a pattern displayed by another computing device, and a network interface 1060 for communicating with other devices via a network, such as the Internet.

The computing device 1000 may run any operating system, such as any of the versions of Microsoft® Windows® operating systems, the different releases of the Unix and Linux operating systems, any version of the MacOS® for Macintosh computers, any embedded operating system, any realtime operating system, any open source operating system, any proprietary operating system, any operating systems for mobile computing devices, or any other operating system capable of running on the computing device 1000 and performing the operations described herein. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described herein. In a more general sense, any suitable combination of hardware, software, and firmware can be used, as will be apparent.

As will be appreciated in light of this disclosure, the various modules and components of the system shown in FIG. 1, such as the browsers 136, 138, can be implemented in software, such as a set of instructions (e.g., C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided herein to be carried out. It will be appreciated that, in some embodiments, various functions performed by the user computing system, as described herein, can be performed by similar processors and/or databases in different configurations and arrangements, and that the depicted embodiments are not intended to be limiting. Various components of this example embodiment, including the streamer device 114, the receiver device 130, and the servers 140, 150, can be integrated into, for example, one or more desktop or laptop computers, workstations, tablets, smartphones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Example Use Cases

One example use case is as follows. A screen in a retail store is set up to display personalized offers to customers in the store. The store also has a camera located near the screen and facing the customers. A webpage is displayed on the screen. The webpage includes a script (e.g., JavaScript) or other code configured to analyze images obtained via the camera. When the customer enters the store, he can login to the store's web site on his smartphone (e.g., via a browser application). Then the customer passes by the screen, which is located in front of a specific product (e.g., a vacuum cleaner accessory). The customer points the display of his phone toward the camera. The camera captures the image displayed by the phone and recognizes a pattern in the image. Using the pattern, a profile of the user can be retrieved from a server or database. Based on the user profile, the screen now can display a better price for the customer or just inform the customer that the accessory is not fitting for the vacuum cleaner he bought the week before.

Another example use case is as follows. In a conference room, multiple screens are displaying a virtual collaborative (e.g., multi-user) whiteboard website, where different documents can be displayed on the screens. Participants can then send documents to one or more of the screens, or retrieve documents displayed on the screens, by pointing the display or camera, respectively, of a smartphone toward the respective screen. In the former case, a camera associated with the screen reads a pattern displayed on the participant's smartphone; in the latter case, the smartphone camera reads a pattern displayed on the screen. The pattern is then used to exchange information between devices. Numerous other example use cases for such browser-screen pairing will be apparent in light of this disclosure.

Numerous embodiments will be apparent in light of the present disclosure, and features described herein can be combined in any number of configurations. One example embodiment provides a system including a storage having at least one memory, and one or more processors each operatively coupled to the storage. The one or more processors are configured to carry out a process including receiving, by a first device via a camera, a series of video frames generated by a web browser of a second device, the series of video frames having an image pattern steganographically hidden therein during playback such that the image pattern is visually imperceptible by a human when the video frames are rendered sequentially; analyzing, by a processor of the first device, the video frames to locate the image pattern; matching, by the processor, the image pattern with a predefined image pattern; and in response to the matching, displaying information associated with the predefined image pattern. In some cases, the process includes retrieving, from a server, the information associated with the predefined image pattern. In some such cases, the process further includes associating the predefined image pattern with a user account, where the information is customized based on the user account. In some cases, the image pattern includes a barcode, a color pattern, or both. In some cases, the image pattern appears for approximately ⅟₆₀th of a second. In some cases, the image pattern appears in a single frame of the series of video frames. Another embodiment provides a non-transient computer-readable medium or computer program product having instructions encoded thereon that when executed by one or more processors cause the processor to perform one or more of the functions defined in the present disclosure, such as the methodologies variously described in this paragraph. As previously discussed, in some cases, some or all of the functions variously described in this paragraph can be performed in any order and at any time by one or more different processors.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method comprising:
   receiving, by a first device via a camera, a series of video frames generated by a web browser of a second device, the series of video frames having an image pattern steganographically hidden therein during playback such that the image pattern is visually imperceptible by a human when the video frames are rendered sequentially;
   analyzing, by a processor of the first device, the video frames to locate the image pattern;
   matching, by the processor, the image pattern with a predefined image pattern; and
   in response to the matching, displaying information associated with the predefined image pattern.

2. The method of claim 1, further comprising retrieving, from a server, the information associated with the predefined image pattern.

3. The method of claim 2, further comprising associating the predefined image pattern with a user account, wherein the information is customized based on the user account.

4. The method of claim 1, wherein the image pattern includes at least one of a barcode and a color pattern.

5. The method of claim 1, wherein the image pattern appears for approximately ⅟₆₀th of a second.

6. The method of claim 1, wherein the image pattern appears in a single frame of the series of video frames.

7. A system comprising:
   a receiver device having a receiver processor and a receiver storage;
   a receiver video display operatively coupled to the receiver processor; and
   a camera operatively coupled to the receiver processor,
   the receiver processor being configured to execute instructions stored in the receiver storage for carrying out a receiver process comprising:
   receiving, via the camera, a series of video frames generated by a web browser of a streamer device, the series of video frames having an image pattern steganographically hidden therein during playback such that the image pattern is visually imperceptible by a human when the video frames are rendered sequentially;
   analyzing the video frames to locate the image pattern;
   matching the image pattern with a predefined image pattern; and
   in response to the matching, displaying, on the receiver video display, information associated with the predefined image pattern.

8. The system of claim 7, further comprising:
   the streamer device, wherein the streamer device includes a streamer processor and a streamer storage; and
   a streamer video display operatively coupled to the streamer processor,
   the streamer processor being configured to execute instructions stored in the streamer storage for carrying out a streamer process comprising:
   receiving, from a website, content having an image pattern encoded therein; and
   sequentially rendering, via the streamer video display, the series of video frames.

9. The system of claim 8, wherein the streamer process further includes rendering a portion of the content not including the image pattern, such that the content is visually perceptible by the human.

10. The system of claim 8, wherein the image pattern is rendered for approximately ⅟₆₀th of a second.

11. The system of claim 8, wherein the image pattern appears in a single one of the series of video frames.

12. The system of claim 7, wherein the receiver process further comprises retrieving, from a server, the information based on the image pattern.

13. The system of claim 12, wherein the receiver process further comprises associating the image pattern with a user account, wherein the information is customized based on the user account.

14. The system of claim 7, wherein the image pattern includes at least one of a barcode and a color pattern.

15. A non-transient computer program product having instructions encoded thereon that when executed by one or more processors cause a process to be carried out, the process comprising:
   receiving a series of video frames generated by a web browser, the series of video frames having an image pattern steganographically hidden therein during playback such that the image pattern is visually imperceptible by a human when the video frames are rendered sequentially;
   analyzing the video frames to locate the image pattern;
   matching the image pattern with a predefined image pattern; and
   in response to the matching, displaying information associated with the predefined image pattern.

16. The computer program product of claim 15, wherein the process further comprises retrieving, from a server, the information based on the predefined image pattern.

17. The computer program product of claim 16, wherein the process further comprises associating the predefined image pattern with a user account, and wherein the information is customized based on the user account.

18. The computer program product of claim 15, wherein the image pattern includes at least one of a barcode and a color pattern.

19. The computer program product of claim 15, wherein the image pattern appears for approximately 1/60th of a second.

20. The computer program product of claim 15, wherein the image pattern appears in a single one of the series of video frames.

* * * * *